Patented Nov. 21, 1939

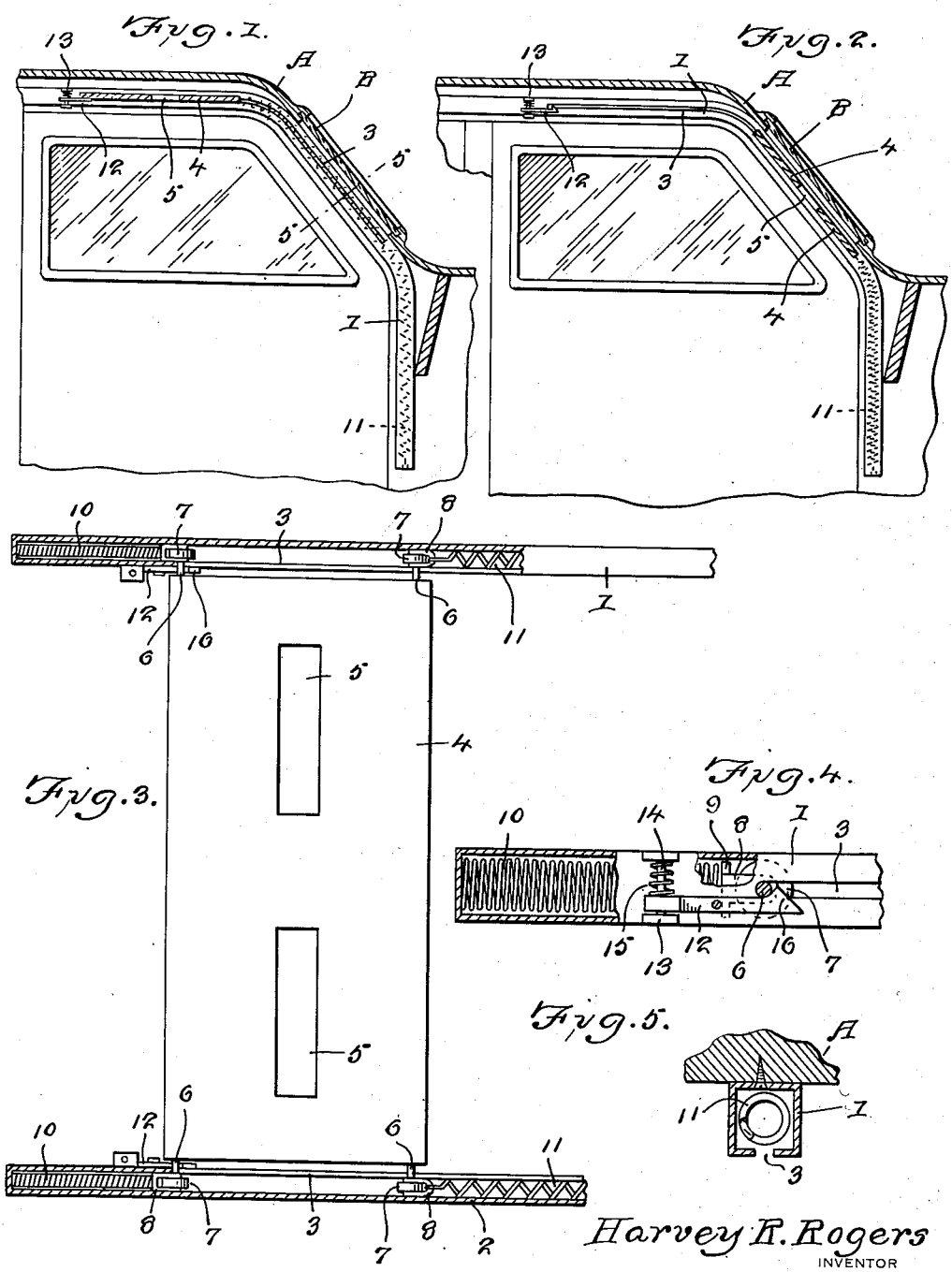

2,180,912

UNITED STATES PATENT OFFICE 2,180,912

VEHICLE OCCUPANT PROTECTOR

Harvey R. Rogers, Springfield, Ill.

Application November 29, 1938, Serial No. 242,996

3 Claims. (Cl. 296—84)

This invention relates to protecting devices for use on motor vehicles, and its general object is to provide a device of that character which includes a shield to protect the occupants of a vehicle from becoming injured by broken and flying glass, in the event the window or windshield glass becomes broken as the result of a collision or other accident and the device is also adaptable for use on police cars and the like in that the shield is preferably made from bullet proof material.

A further object is to provide a protecting device that includes a spring actuated shield normally held in a position out of use, but is automatically released such as by a shock caused by a sudden stop of the vehicle due to a hard application of the brakes or a collision, so as to occupy a position in use, and the shield can be easily and expeditiously manually released, if desired.

Another object is to provide a protecting device that will not obstruct the vision of the operator of the vehicle when the shield is in use, and it can be readily installed on any type of vehicle without any change in the structure of the latter.

A still further object is to provide a protecting device of the character set forth, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary sectional view taken through a motor vehicle body, showing my device installed therein and with the parts of the device in normal position.

Figure 2 is a similar view illustrating the shield of the device released and in position for use.

Figure 3 is a fragmentary sectional view of the device per se, with parts in elevation.

Figure 4 is an enlarged fragmentary sectional view illustrating the latching mechanism and adjacent elements.

Figure 5 is a sectional view taken approximately on line 5—5 of Figure 1.

Referring to the drawing in detail, the letter A indicates a fragmentary portion of the body of a motor vehicle and B the windshield glass with which my device is associated in the form as shown, but it will be understood that the device can be constructed for association with the glass of the windows of the vehicle, so as to provide complete protection, under all circumstances.

The device includes a pair of like guide members or tracks 1 and 2 which in the form shown are fixed by screws or the like, to the sides of the vehicle body in parallelism with each other and in close proximity to the top and windshield frame, and are of a length to extend a considerable distance below the latter to terminate adjacent to the floor. The guide members are shaped to follow the top and frame and are of cross sectional square tubular formation, with guide slots 3 extending for a portion of the length of the outer or confronting walls thereof, as clearly shown in Figure 3.

Bridging the guide members or tracks 1 and 2 is a shield 4 preferably made from bullet proof material such as steel or the like, into rectangular shape in the form shown, and the shield is provided with elongated sight openings 5 to allow for free and unobstructed vision of the operator of the vehicle, when it is disposed in position for use, as shown in Figure 2. Welded or otherwise secured to the ends of the shield adjacent to the corners thereof are stub shafts 6 that extend through the slots 3, and have journaled thereon by suitable bearings, rollers 7 mounted to travel in the guide members, for free movement of the shield to its respective positions of Figures 1 and 2.

Each of the stub shafts have secured thereto a susbtantially U-shaped attaching member 8 and the members 8 on the rear shafts preferably have enlarged bight portions to provide abutment plates 9 for the front end convolutions of expansion coil springs 10 that have their rear end convolutions abutting the rear closed ends of the guide members, as clearly shown in Figure 3, while the U-shaped members that are secured to the front stub shafts have connected thereto one of the ends of compression coil springs 11, that have their opposite ends secured to the lower ends of the vertical portions of the guide members, as will be apparent upon inspection of Figures 1 and 2. By that construction, it will be obvious that the shield will be forced forwardly by the coil springs 10 and pulled accordingly by the coil springs 11. It will be understood that the ends of the slots 3 limit the movement of the shield to its respective positions of Figures 1 and 2, and when in the latter position the shield is disposed directly to the rear of the windshield to protect the occupants of the vehicle in the event the glass thereof should become broken.

In order to hold the shield in its normal position of Figure 1, I provide automatically releasable latching members one for each of the rear stub shafts, and which include spring pressed dogs 12 pivoted between their ends to the confronting walls of the guide members, the walls having superimposed ears 13 formed thereon, with guide pins 14 bridging the ears and the rear ends of the dogs are enlarged and bifurcated to receive the pins which have sleeved thereon coil springs 15 to hold the dogs in normally latched position, as shown in Figure 4. The front ends of the dogs are formed to provide substantially hook shaped cam heads 16 to receive the rear stub shafts as likewise best shown in Figure 4, and the cam heads have rearwardly inclined cam faces disposed in the path of the stub shafts to allow the latter to ride thereon for disposal to the rear of the hook portions of the heads to be held thereby.

From the above description and disclosure in the drawing, it will be obvious that in the event the vehicle equipped with my device should be suddenly stopped by a hard application of the brakes, or by a collision, the shock caused thereby will result in the dogs being moved on their pivots against the action of the coil springs 15 and thereby release the shield to allow the coil springs 10 and 11 to move the same from its normal position of Figure 1, to that of Figure 2, with the result if the windshield glass should become broken as a result of a collision the occupants of the vehicle will be protected against broken or flying glass, as will be apparent.

While the latching means are instantly released by a shock of the vehicle as above set forth, they of course can be manually released with minimum effort, due to the fact that they are arranged exteriorly of the guide members and merely by the application of slight pressure to the bifurcated ends thereof, and that feature, together with the bullet proof properties of the shield, renders my device extremely advantageous for use on police cars.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device for protecting the occupants of a motor vehicle from broken glass comprising a metallic shield having sight openings therein, tubular members slotted for a portion of their length and shaped to provide tracks secured within the body of the vehicle in parallelism with each other, stub shafts secured to the shield and extending through the slots, rollers journaled on the stub shafts and mounted in the tracks for slidable movement of the shield into and out of shielding position with respect to a glass closure of the vehicle, spring means for urging and holding the shield into shielding position, and spring pressed automatically actuated latching means arranged in the path of certain of the stub shafts to receive the same for holding the shield out of shielding position.

2. A device for protecting the occupants of a motor vehicle from broken glass comprising a rectangular shield having sight openings therein, tubular members slotted for a portion of their length and shaped to provide tracks secured within the body of the vehicle in parallelism with each other, stub shafts secured to and extending from the ends of the shield and into the slots, rollers journaled on the stub shafts and mounted in the tracks for slidable movement of the shield into and out of shielding position with respect to a glass closure of the vehicle, coil springs mounted in the tubular members for urging and holding the shield into shielding position, and automatically actuated spring pressed latching dogs for holding the shield out of shielding position.

3. A device for protecting the occupants of a motor vehicle from broken glass, comprising a rectangular shield formed from bullet proof material and having sight openings extending longitudinally therein, tubular members slotted for a portion of their length and shaped to provide tracks secured within the body of the vehicle in parallelism with each other, stub shafts secured to the ends of the shield adjacent to the corners thereof and extending through the slots, rollers journaled on the stub shafts and mounted in the tracks for slidable movement of the shield into and out of shielding position with respect to a glass closure of the vehicle, coil springs mounted in the tubular members for urging and holding the shield into shielding position, and automatically actuated latching means for holding the shield out of shielding position and including spring pressed dogs pivotally mounted exteriorly of the tubular members, cammed substantially hook shaped heads for the dogs and disposed in the path of certain of said stub shafts for hooked association of the latter shafts therewith, and said dogs being releasable from the shafts by a sudden shock of the vehicle.

HARVEY R. ROGERS.